T. T. & H. W. S. COLLIER.
Cotton-Planter.
No. 25,388.
Patented Sept. 13, 1859.
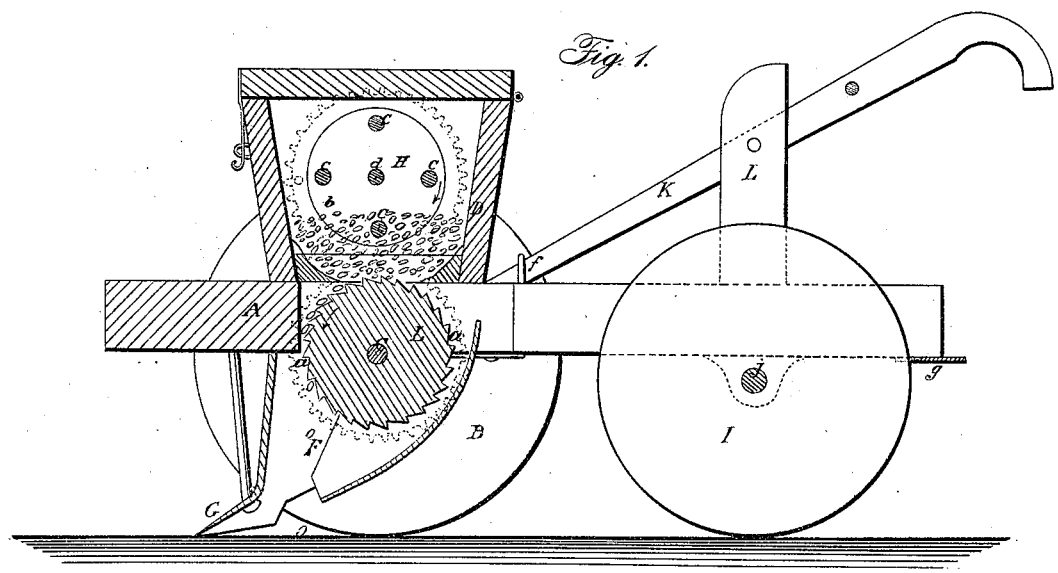
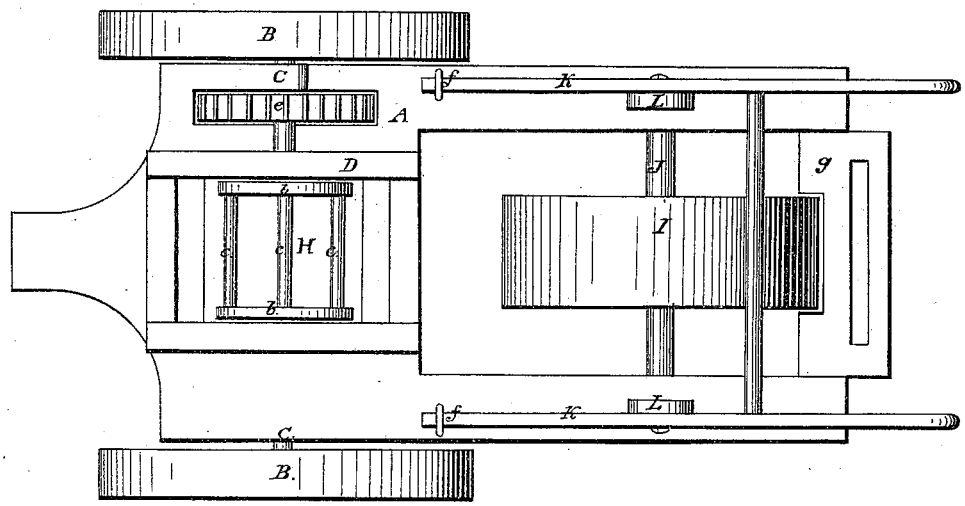
Witnesses:
E. Toole
L. P. Hughs
Inventor:
T. T. Collier
H. W. S. Collier

UNITED STATES PATENT OFFICE.

T. T. COLLIER AND H. W. S. COLLIER, OF LAVERNIA, TEXAS.

IMPROVEMENT IN COTTON-SEED PLANTERS.

Specification forming part of Letters Patent No. 25,388, dated September 13, 1859.

*To all whom it may concern:*

Be it known that we, T. T. COLLIER and H. W. S. COLLIER, both of Lavernia, in the county of Bexar and State of Texas, have invented a new and Improved Cotton-Planter; and we do hereby declare that the following is a full, clear, and exact description of the same, reference being had to the accompanying drawings, forming a part of this specification, in which—

Figure 1 represents a longitudinal vertical section of our invention, and Fig. 2 is a plan or top view of the same.

Similar letters of reference in both views indicate corresponding parts.

This invention consists in arranging in the hopper a stirrer consisting of two disks united by horizontal rods which revolve over and feed the seed to the distributer, that consists of a roller the face of which is cut out in the shape of ratchet-teeth, forming a series of seed-cells which carry the seed to the discharge-tube and in the furrow made by the hollow plow-share, which serves as a discharge-tube, and after the seed has thus been deposited on the ground it is pressed by a packing-wheel with a broad face which is kept clean by a scraper.

To enable those skilled in the art to make and use our invention, we will proceed to describe its construction and operation.

The frame A, which is constructed of wood or any other suitable material, rests with its front part on the two driving-wheels B, which are mounted on the axle C in the usual manner. Between these two wheels, and right over the axle C, is the hopper which contains the seed.

E is the distributer, that is firmly secured on the driving-axle C under the center of the hopper. Its face is cut out in the form of ratchet-teeth, forming a series of seed-cells, $a$, which take the seed from the hopper and bring it to the discharge-tube F. The lower end of this tube forms a plowshare, G, which draws the furrows in which the seed is deposited.

The discharge of the seed from the hopper is facilitated by a stirrer, H, constructed of two disks, $b\ b$, which are united by horizontal rods $c$, and which are mounted on an arbor, $d$, that receives a rotary motion by means of gear-wheels $e\ e$, one of which is secured on the driving-axle C and the other one on the arbor $d$, as clearly represented in Fig. 1 in dotted lines.

The back end of the frame A rests on the packing-wheel I, that is secured on an axle, J, in line with the furrow-share G, and its face is of considerable width, so that it reaches over the furrow on both sides, pressing the seed down tightly into the ground. The face of the packing-wheel is kept clear by a scraper, $g$, secured to the back end of the frame A.

The machine is guided by two handles, K, secured to the frame by means of staples $f$ and standards L in the usual manner.

The particular advantage of our invention consists in the construction of the stirrer and distributer. The rods $c$ of the former are parallel with the seed-cells $a$ of the latter, and as they both rotate in opposite directions the seed is drawn in between them, and the rods $c$ force the same into the cells $a$, keeping up a regular supply. By these means the seed is discharged regularly and evenly from one end of the field to the other, and as the packing-roller I passes over it after it has been deposited on the ground it is pressed down and covered over, so as to require no further attendance.

What we claim as new, and desire to secure by Letters Patent, is—

The arrangement of the distributer E and the stirrer H, constructed, as described, to operate in combination with the packing-wheel I, substantially as and for the purpose set forth.

T. T. COLLIER.
H. W. S. COLLIER.

Witnesses:
E. TOOLE,
L. P. HUGHES.